(12) United States Patent
Foley

(10) Patent No.: US 8,230,286 B1
(45) Date of Patent: Jul. 24, 2012

(54) PROCESSOR RELIABILITY IMPROVEMENT USING AUTOMATIC HARDWARE DISABLEMENT

(75) Inventor: John Foley, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 12/485,517

(22) Filed: Jun. 16, 2009

(51) Int. Cl.
*G01R 31/28* (2006.01)

(52) U.S. Cl. .......................................... 714/736; 714/44

(58) Field of Classification Search .................. 713/165; 375/350; 712/227; 714/11, 736, 44
See application file for complete search history.

(56) References Cited

U.S. PATENT DOCUMENTS

| | | | | |
|---|---|---|---|---|
| 5,630,046 | A * | 5/1997 | Loise | 714/11 |
| 6,212,635 | B1 * | 4/2001 | Reardon | 713/165 |
| 7,263,631 | B2 | 8/2007 | VanBuren | |
| 7,535,980 | B2 * | 5/2009 | Yang et al. | 375/350 |
| 7,966,538 | B2 * | 6/2011 | Bertacco et al. | 714/736 |
| 2010/0082950 | A1 * | 4/2010 | Kinzhalin et al. | 712/227 |

\* cited by examiner

*Primary Examiner* — David Ton
(74) *Attorney, Agent, or Firm* — Edell, Shapiro & Finnan, LLC

(57) ABSTRACT

Techniques are provided herein to dynamically disable a hardware component in a processor device. Notifications for single-bit errors detected in a hardware component are received. The hardware component is disabled for a period of time when a number of single-bit errors exceeds a threshold. In addition, techniques are provided to permanently disable one or more hardware components in order to minimize the number of system malfunctions associated with single event upsets (SEUs).

22 Claims, 6 Drawing Sheets

PROCESSOR RELIABILITY IMPROVEMENT USING AUTOMATIC HARDWARE DISABLEMENT

TECHNICAL FIELD

The present disclosure relates to microprocessor devices and systems, and more particularly to improving the reliability of such devices or systems when exposed to radiation.

BACKGROUND

A single event upset (SEU) occurs in a electronic circuit device, such as a digital circuit, when the device is exposed to energetic ions and protons. This is a particular concern for circuit devices that are to be deployed for operation in space, such as Earth orbit.

Certain hardware components in integrated circuit processor devices (i.e., "chip sets") are unusually sensitive to SEUs. Errors that occur in some components can cause a system to freeze, crash, generate exceptions, etc.

DESCRIPTION OF EXAMPLE EMBODIMENTS

Overview

Techniques are provided herein to dynamically disable a hardware component in a processor device. Notifications for single-bit errors detected in a hardware component are received. The hardware component is disabled for a period of time when a number of single-bit errors exceeds a threshold. In addition, techniques are provided to permanently disable one or more hardware components in order to minimize the number of system malfunctions associated with single event upsets (SEUs).

Example Embodiments

Figure 1:
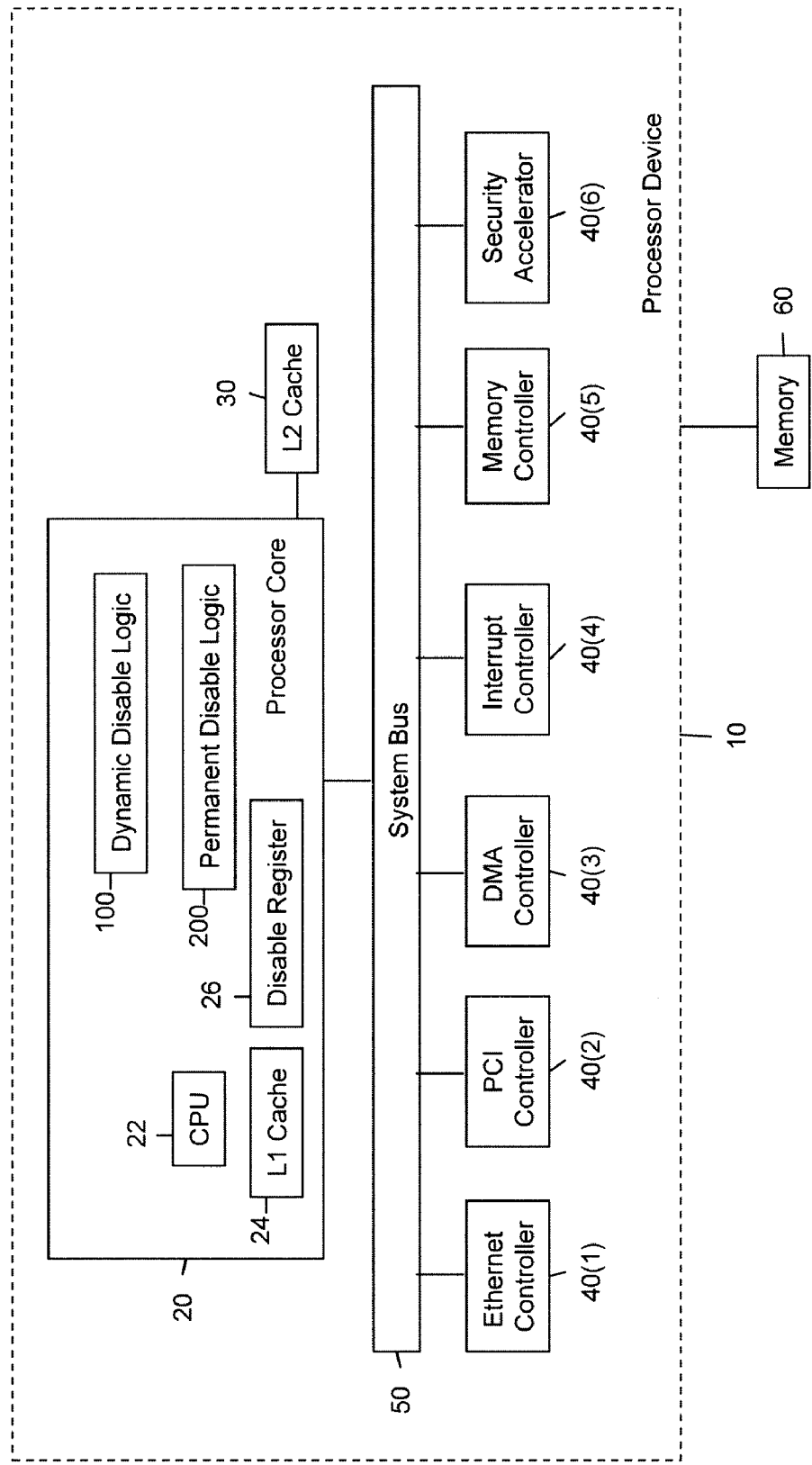
FIG. 1 is an example of a block diagram of a processor device that is configured to automatically and dynamically disable a hardware component of the processor device.

Referring first to FIG. 1, a processor device is shown generally at reference numeral 10. The processor device 10 may be implemented in a single integrated circuit form, as a so-called system-on-chip (SOC), or in multiple separate integrated circuits. The techniques described herein apply to either form. FIG. 1 illustrates only examples of components of the processor device 10 that pertain to the techniques described herein. It should be understood that there are additional components that are not shown for the sake of simplicity. The processor device 10 may be a microprocessor, microcontroller, digital signal processor, etc.

The processor device 10 comprises a processor core 20 that contains the main processing components. For example, the processor core 20 comprises a central processing unit (CPU) 22 and a level 1 (L1) cache 24. Also included in the processor core are a plurality of registers including a disable register 26 whose function is described further hereinafter in connection with FIG. 5. There is also L2 cache 30 that is shown, for example, outside of the processor core 20.

The processor core 20 also includes logic that enables the processor device 10 to perform the disabling techniques described herein. In particular, there is dynamic (or automatic) disable logic 100 and permanent disable logic 200. While FIG. 1 shows that the dynamic disable logic 100 and permanent disable logic 200 reside in the processor core 20, this is only by way of example. The dynamic disable logic 100 is described in further detail hereinafter in connection with FIGS. 2-5 and the permanent disable logic 200 is described in further detail hereinafter in connection with FIG. 6.

The are numerous hardware components that perform functions for the processor device 10. The CPU 22, L1 cache 24 and L2 cache 30 are examples of such hardware components. Examples of additional hardware components are an Ethernet controller 40(1), a peripheral component interconnect (PCI) controller 40(2), a direct memory access (DMA) controller 40(3), an interrupt controller 40(5), a memory controller 40(5) and a security accelerator 40(6). These additional hardware components connect to a system bus 50 as does the processor core 20.

A memory 60 is shown as being external to the processor device 10. The memory 60 may comprise one or more of dynamic random access memory (DRAM), static RAM (SRAM), read only memory (ROM), flash memory, etc. While the dynamic disable logic 100 and the process disable logic 200 are shown in FIG. 1 as being part of the processor core 20, it should be understood that these logic blocks may be implemented by software instructions stored in memory 60 (in any of the aforementioned listed or other forms of memory). The memory 60 may be part of the processor device 10, i.e., integrated into the same circuit board or chip(s).

Techniques are provided herein to automatically disable a hardware component, such as any of the hardware components shown in FIG. 1 (or other hardware components not shown in FIG. 1), when a high occurrence of single-bit errors have been detected for that hardware component. This would normally occur during a radiation storm (i.e., a sun spot) in an Earth orbit, such as a geosynchronous orbit.

In some forms of processor devices, such as that shown in FIG. 1, the L1 and L2 caches are "on-chip". Moreover, the L1 cache 24 may have parity checking and the L2 cache 30 may be configured for error correction code (ECC) protection. Nevertheless, L1 and L2 caches have proven to be unusually sensitive to SEUs, which can cause cache errors that lead to system freeze, system crash, system exceptions, etc.

Many processor devices provide the capability to detect and possibly correct errors in the L2 cache. For example, an L2 cache may be configured to detect and automatically correct single-bit errors. Multi-bit errors are generally not corrected and may result in corrupted data within the processor system. Because program stack space is typically resident in the system caches due to the dynamic behavior of the stack, a multi-bit error in the cache is likely to bring the system down.

Thus, the L2 cache is a prime example of a hardware component that may be automatically disabled when a high occurrence of single-bit errors have been detected. After a period of time, the L2 cache is automatically enabled again.

Testing has shown that the L2 cache to be the most susceptible component on some processor devices when exposed to radiation. Permanently disabling the L2 cache would significantly degrade system performance. However, disabling the L2 cache only during elevated periods of radiation exposure has the advantage of allowing the system to run more efficiently most of the time.

Again, the L2 cache is one example of hardware components that may be dynamically disabled according to the techniques described herein. Other hardware components, such as any of the hardware components 40(1)-40(6), may be dynamically disabled in the manner described herein.

Figure 2:
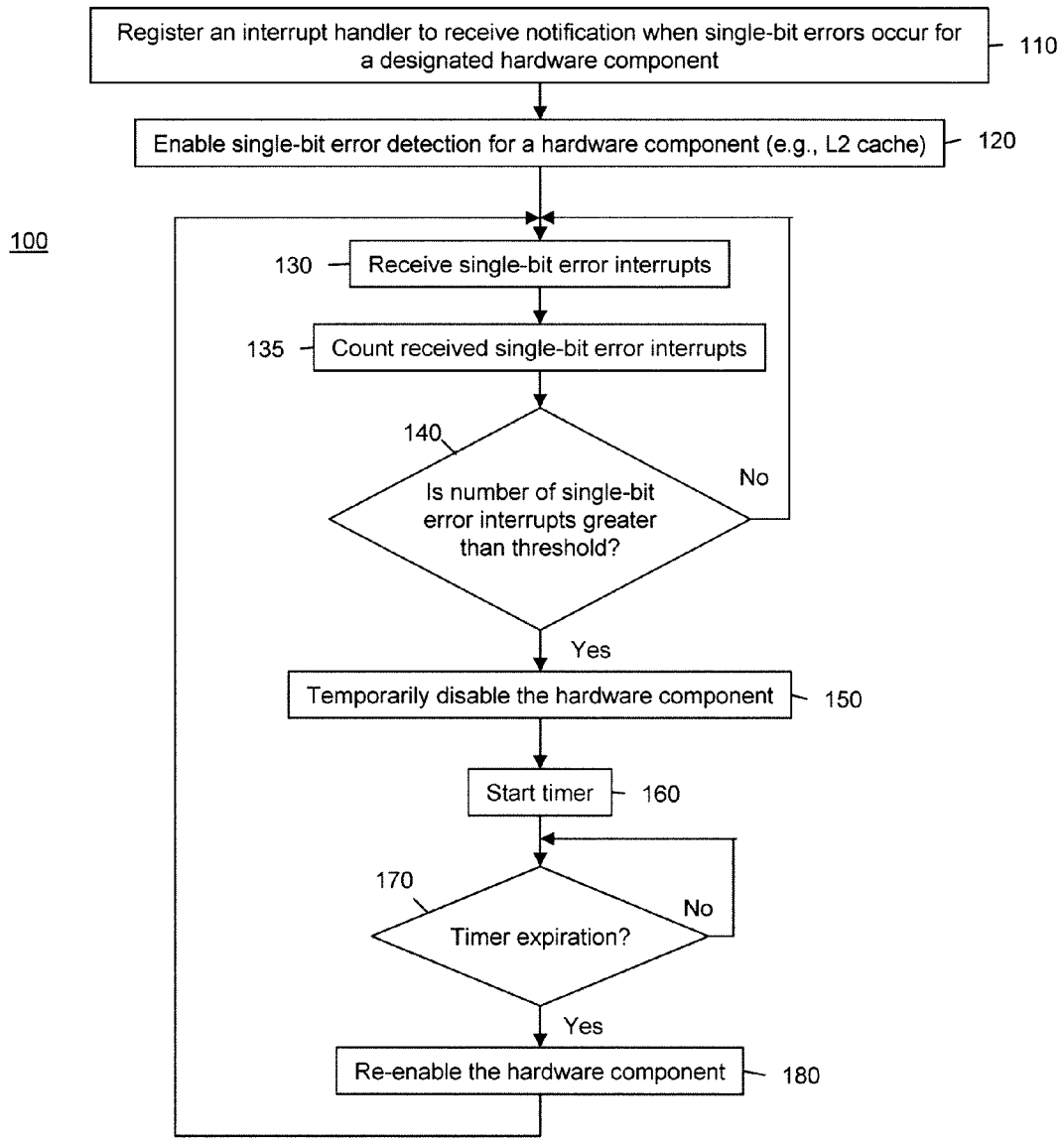
FIG. 2 is an example of a flow chart for dynamic disable logic that configures a processor device to dynamically disable a hardware component.

Turning now to the flowchart of FIG. 2, the dynamic disable logic 100 is described in more detail. At 110, registration is made with an interrupt handler to receive notifications when single-bit errors occur for a designated hardware component. The interrupt handler is a process running in the processor core 20 that manages interrupts generated by any hardware component in the processor device 10. The interrupt handler may be a general interrupt handler or an interrupt handler for a specific hardware component. Again, an example of a hardware component for which notifications of single-bit error interrupts are to be made is the L2 cache 30. In one example, an interrupt handler dedicated to a particular hardware component, e.g., the L2 cache 30, may be used as the trigger mechanism to decide whether to disable that hardware component and one or more other hardware components, such as the PCI controller 40(2). In this way, it is not necessary to register interrupt handlers for errors in multiple different hardware components and a single interrupt handler (e.g., dedicated to one hardware component such as the L2 cache) can be used as the only trigger mechanism to determine when radiation exposure to the processor device 10 is elevated and the decision to disable multiple components is based solely on that one hardware interrupt, e.g., the L2 cache error interrupt.

At 120, single-bit error detection for the designated hardware component is enabled. That is, some hardware components may have the capability to detect single-bit errors, but this function may need to be enabled because it may not always be activated. Thus, functions 110 and 120 are coordinated accordingly for the hardware component that is to be dynamically disabled.

At 130, notification of single-bit errors are received in the form of single-bit error interrupts from the interrupt handler. The received single-bit error interrupt notifications are counted at 135. At 140, the number of single-bit errors that have occurred is compared with a threshold. For example, a running count is kept of the number of single-bit errors received over a period of time indicative of exposure to radiation, or since the most recent disablement. When the number of single-bit errors exceeds a threshold, then at 150 processor issues a command to (temporarily) disable the hardware component.

After the hardware component is disabled, a timer is started at 160. The timer is a process executed by the processor device 10 and continues for a period of time to allow the radiation event that likely caused the single-bit errors to pass, before re-enabling the hardware component. Thus, when the timer expires at 170, the hardware component is re-enabled at 180. The functions 130-180 are repeated after the hardware component is re-enabled as shown in FIG. 1. In one example, the duration of the timer is five minutes.

Figure 3:
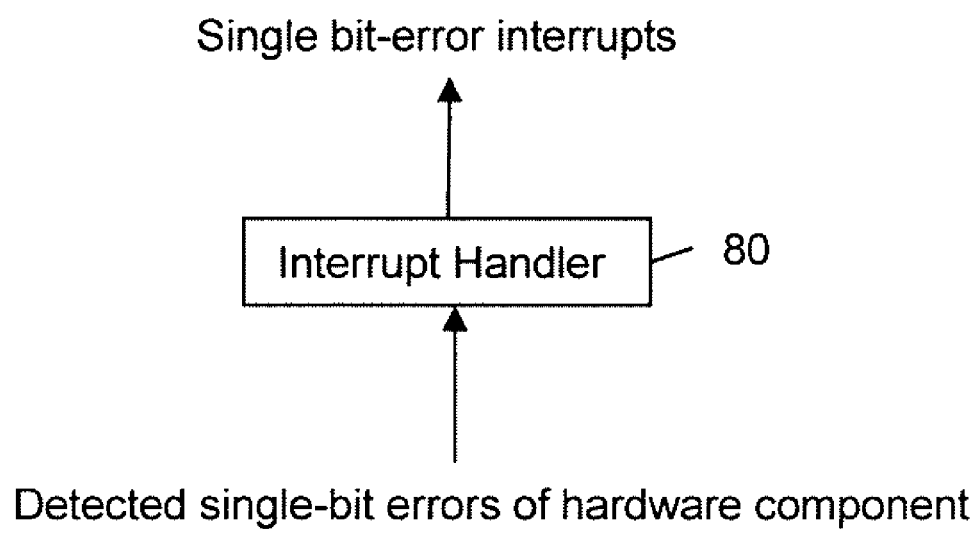
FIG. 3 is a diagram depicting the configuration of an interrupt handler to provide notifications of single-bit errors detected for a hardware component.

FIG. 3 illustrates an interrupt handler process 80 that monitors for single-bit errors detected by a hardware component and generates notifications in the form of single-bit error interrupts that are received at function 130 and counted at 135 for evaluation at the decision function 140 in FIG. 2.

Figure 4:
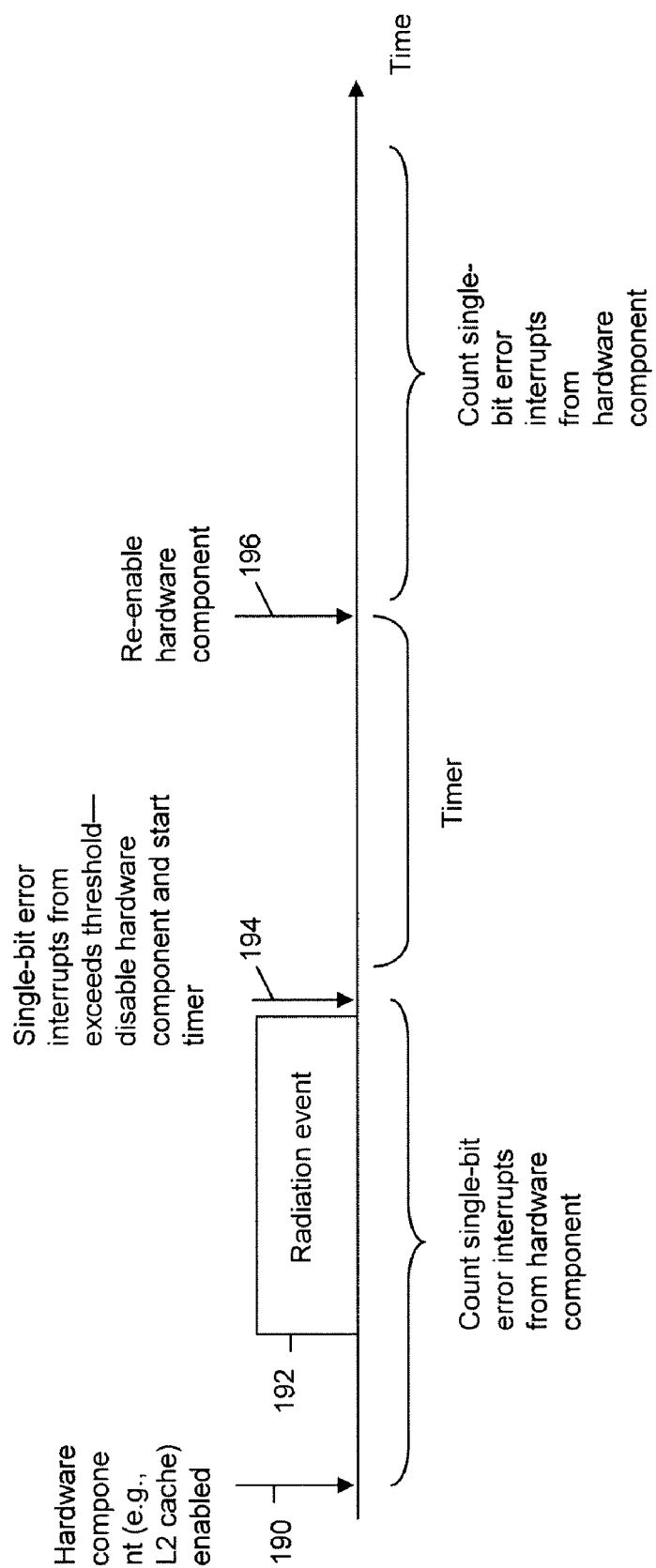
FIG. 4 is a diagram of a timeline depicting an example of the operation of the dynamic disable logic.

FIG. 4 illustrates an example of a timeline for operation of the dynamic disable logic 100. At 190, the hardware component is enabled for normal operation, which may coincide with system boot-up. Thereafter, any single-bit error interrupts for that hardware component that are received are counted. At 192, a radiation event begins and extends for a period of time as shown in the figure. During this time, received single-bit error interrupts are counted and eventually the number of received single-bit error interrupts for that hardware component is determined to exceed a threshold. Thus, at 194, the hardware component is disabled and the timer is started such that the hardware component is disabled for a period of time corresponding to the duration of the timer. At 196, the timer expires and the hardware component is re-enabled. Thereafter, any received single-bit errors are counted and the process repeats as explained above in connection with FIG. 2.

Figure 5:
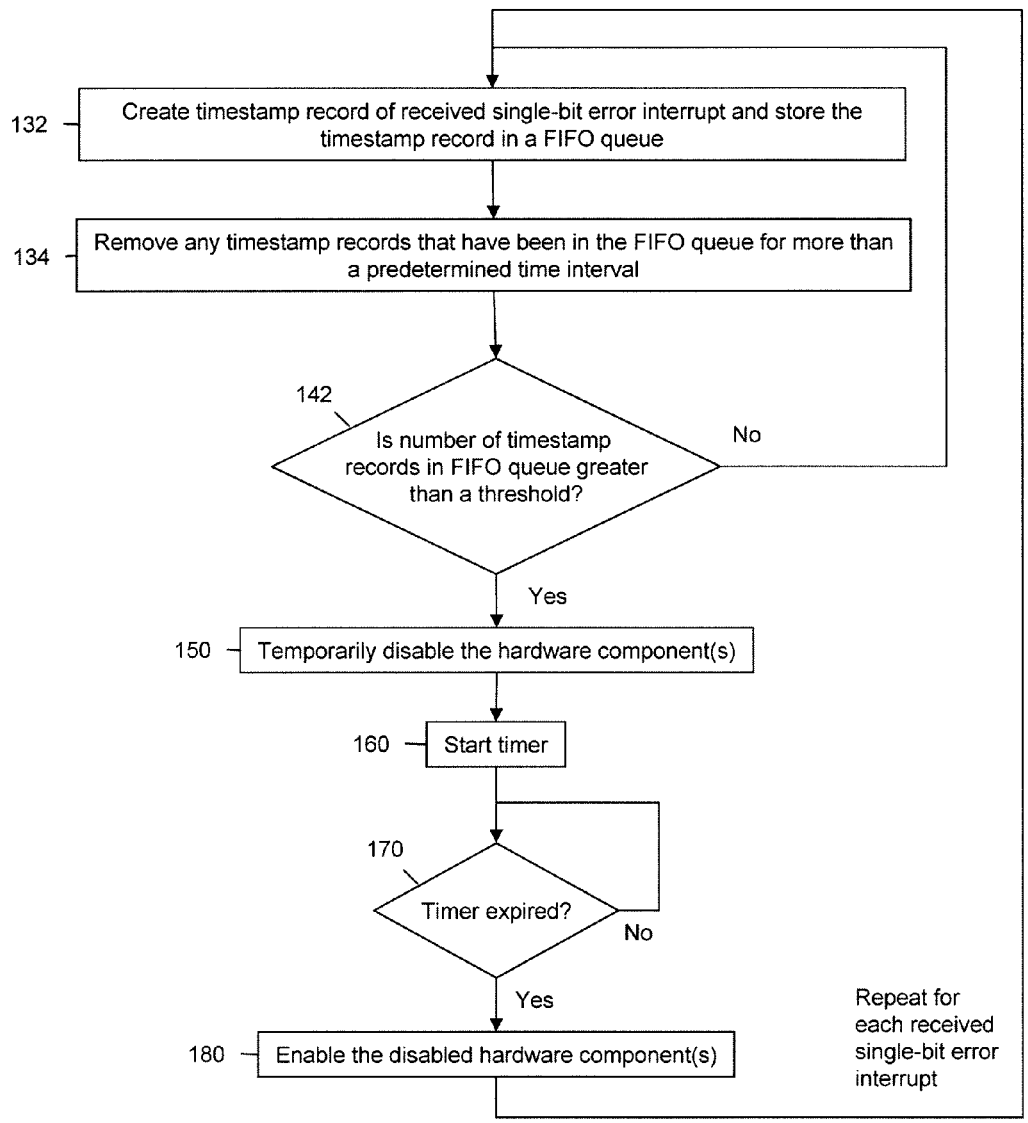
FIG. 5 is a flow chart for another example of the dynamic disable logic.

Turning to FIG. 5, another example of logic to determine whether to disable a hardware component is now described. Functions 110-130 are performed as described above in connection with FIG. 2. At 132, a timestamp record is created for a received notification of a single-bit error and the timestamp record is stored in a first-in-first-out (FIFO) queue or buffer. At 134, any timestamp records that have been in the FIFO queue for more than a predetermined time interval are removed. At 142, the number of timestamp records in the FIFO queue is compared with a threshold. When the threshold is exceeded, then the one or more hardware components are disabled at 150. When the threshold is not exceeded, then the process repeats from 132 for each received single-bit error interrupt. Functions 160-180 shown in FIG. 5 are the same as those functions shown in FIG. 2.

Figure 6:
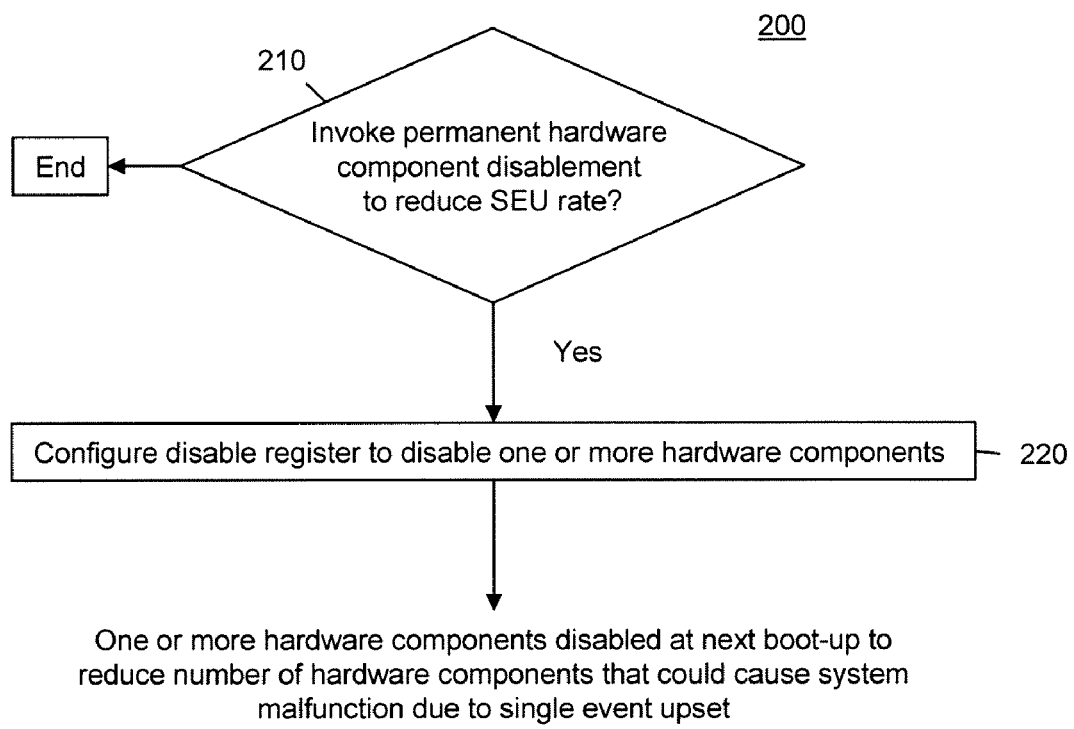
FIG. 6 is an example of a flow chart for permanent disable logic that configures a processor device to permanently disable a hardware component.

Reference now is made to FIG. 6 in conjunction with FIG. 1. There are circumstances when system performance is best maintained by permanently disabling one or more hardware components to reduce the SEU rate. As shown in FIG. 1, there is a disable register 26. The disable register 26 may store information to configure one or more hardware components to be permanently disabled. For example, the security accelerator 40(6) may not be needed for some phases of operations of the host device in which the processor device 10 is deployed. Therefore, information may be written into the disable register 26 to permanently disable the security accelerator 40(6) for the duration that the host device in which the processor device is deployed is operating. When the security accelerator 40(6) is permanently disabled, SEUs to any of its registers can no longer cause the processor device 10 to "freeze", cause a machine check or any other type of error event. In the meantime, other hardware components remain operational and without disruption otherwise caused by SEUs to the security accelerator 40(6). Some processor devices may not have a dedicated disable register and instead would be configured to permanently disable one or more hardware devices through some other means.

In FIG. 6, the permanent disable logic 200 involves a decision at 210 as to whether to invoke permanent hardware component disablement to reduce SEU rate. This may be presented to a user or host device administrator through a user interface of the host device. If the permanent disablement function is to be made for a designated hardware component, then at 220, information is written into the disable register 26 (FIG. 1) so that the disable register is configured to cause the designated one or more hardware components to be permanently disabled until the next boot-up of the processor device 10. The default mode of the processor device 10 may be such that all hardware components blocks are enabled. When a hardware component is disabled using disable register 26, there is no need to reboot the processor device 10 for the change to take effect. Rather, the hardware component is immediately disabled. But when the processor device 10 is rebooted, all hardware components are enabled again by default. Thus, the process of disabling certain hardware components needs to be repeated.

The foregoing techniques are useful in any host device that uses a processor device, such as a computing device, wired or wireless communication device, network device such as a network router, etc.

The logic described herein, e.g., dynamic disable logic 100 and permanent disable logic 200, may take any of a variety of forms, so as to be encoded in one or more tangible media for execution. For example, the logic may be in the form of software code instructions stored in memory (a memory in the processor core 20 or memory 60) and for execution by the processor core 20 to perform the functions described herein. In another example, the logic 100 and 200 may be in the form of digital logic gates, a programmable gate array device or other programmable or fixed logic device, configured to perform the functions described herein.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   in a processor device, receiving notifications for single-bit errors detected in hardware component; and
   disabling the hardware component for a period of time when a number of single-bit errors exceeds a threshold.

2. The method of claim 1, and further comprising re-enabling the hardware component after the period of time.

3. The method of claim 2, and further comprising repeating said receiving and disabling after re-enabling the hardware component.

4. The method of claim 1, and further comprising registering with an interrupt handler to receive the notifications for single-bit errors detected in the hardware component and enabling detection of single-bit errors in the hardware component.

5. The method of claim 4, wherein registering comprises registering an interrupt handler for a particular hardware component, and wherein disabling comprises disabling multiple hardware components based on notifications of single-bit errors received for the particular hardware component.

6. The method of claim 5, wherein the particular hardware component is a level 2 cache.

7. The method of claim 1, and further comprising counting the number of single-bit errors received over a predetermined time interval, and wherein disabling comprises disabling the hardware component when the number of single-bit errors received over the predetermined time interval exceeds the threshold.

8. The method of claim 1, and further comprising creating a timestamp record for each received notification of a single-bit error, storing each timestamp record in a first-in-first-out queue, removing from the first-in-first-out queue timestamp records that have been in the queue for more than a predetermined time interval, comparing a number of timestamp records in the first-in-first-out queue with a threshold, and wherein disabling comprises disabling the hardware component when the number of timestamp records in the first-in-first-out queue exceeds the threshold.

9. The method of claim 1, wherein receiving notifications comprises receiving notifications of single-bit errors detected in a level 2 cache, and wherein disabling comprises disabling the level 2 cache.

10. The method of claim 1, and further comprising configuring the processor device to permanently disable one or more hardware components in the processor device.

11. An apparatus comprising:
    a processor core in a processor device; and
    at least one hardware component that is configured to perform a function associated with the processor device;
    wherein the processor core is configured to receive notifications for single-bit errors detected in the at least one hardware component and to disable the hardware component for a period of time when a number of single-bit errors exceeds a threshold.

12. The apparatus of claim 11, wherein the processor core is further configured to re-enable the hardware component after the period of time.

13. The apparatus of claim 11, wherein the processor core is further configured to count the number of single-bit errors received over a predetermined time interval, and to disable the hardware component when the number of single-bit errors received over the predetermined time interval exceeds the threshold.

14. The apparatus of claim 11, wherein the processor core is configured to register an interrupt handler for a particular hardware component and to disable multiple hardware components based on notifications of single-bit errors received for the particular hardware component.

15. The apparatus of claim 11, wherein the processor core is configured permanently disable one or more hardware components in the processor device.

16. Logic encoded in one or more tangible media for execution and when executed operable to:
    receive notifications for single-bit errors detected in a hardware component of a processor device;
    disable the hardware component for a period of time when a number of single-bit errors exceeds a threshold.

17. The logic of claim 16, and further comprising logic configured to re-enable the hardware component after the period of time.

18. The logic of claim 16, and further comprising logic that is configured to register with an interrupt handler to receive the notifications for single-bit errors detected in the hardware component and to enable detection of single-bit errors in the hardware component.

19. The logic of claim 18, wherein the logic that registers is configured to register an interrupt handler for a particular hardware component, and wherein the logic that disables is configured to disable multiple hardware components based on notifications of single-bit errors received for the particular hardware component.

20. The logic of claim 16, and further comprising logic configured to count the number of single-bit errors received over a predeteiniined time interval, and to disable the hardware component when the number of single-bit errors received over the predetermined time interval exceeds the threshold.

21. The logic of claim 16, wherein the logic that receives is configured to receive notifications of single-bit errors detected in a level 2 cache, and the logic that disables is configured to disable the level 2 cache when a number of single-bit errors exceeds the threshold.

22. The logic of claim 16, and further comprising logic to permanently disable one or more hardware components of the processor device.

* * * * *